N. BARNUM.
Improvement in Plumb-Levels and Clinometers.
No. 126,372.  Patented May 7, 1872.
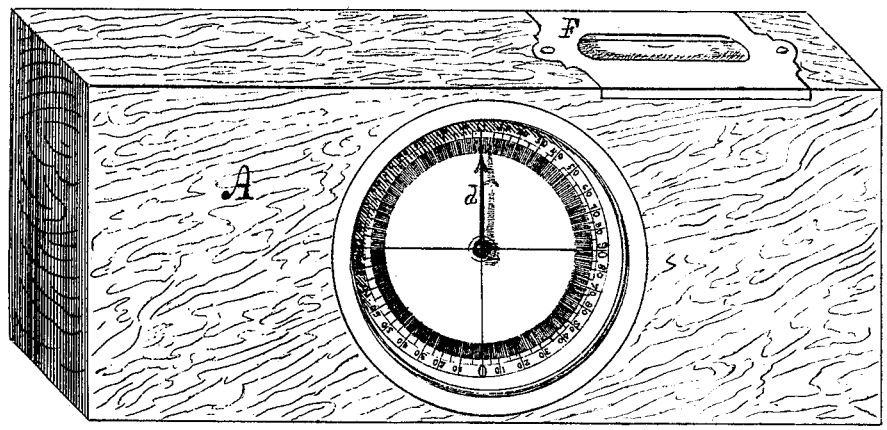
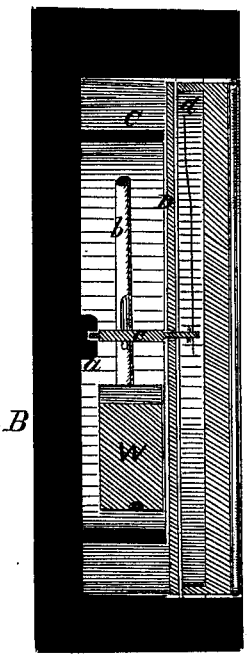
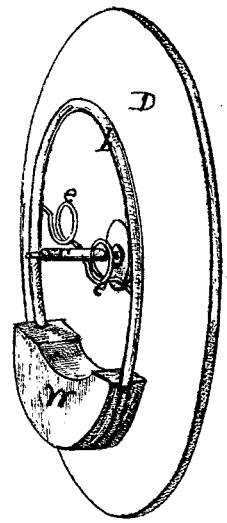
Witnesses
E. A. West.
Q. W. Bond.
Nelson Barnum
INVENTOR

UNITED STATES PATENT OFFICE.

NELSON BARNUM, OF LA PORTE, INDIANA, ASSIGNOR OF ONE-HALF OF HIS RIGHT TO HARRY C. GOODRICH, OF CHICAGO, ILLINOIS.

IMPROVEMENT IN PLUMB-LEVELS AND CLINOMETERS.

Specification forming part of Letters Patent No. 126,372, dated May 7, 1872.

SPECIFICATION.

I, NELSON BARNUM, of La Porte, in the county of La Porte and State of Indiana, have invented a certain new and useful Improved Protractor, of which the following is a full description, reference being had to the accompanying drawing making a part of this specification, in which—

Figure 1 is a perspective; Fig. 2, a transverse vertical section; and Fig. 3, a perspective of a portion of the instrument, taken from the rear.

The object of my invention is to construct an improved instrument for the use of mechanics, which may be used as an ordinary level, and also for the purpose of obtaining angles.

In the drawing, A represents a piece of wood, which, for ordinary purposes, may be about two feet long, and three or four inches wide, and an inch and a half thick. In one side of this block I make a circular recess to receive the other parts of the device. B represents a metal cup fitting into this recess in A, within which cup, and fastened to the bottom thereof, is a metal ring or band, C. This band C may be dispensed with by using a smaller cup than that shown in the drawing. The bottom of the cup may also be left out by providing a suitable bearing for the spindle or arbor c. I provide a bearing, a, for one end of the spindle c, the other end of which passes through the graduated disk D, moving freely therein; and the pointer d is fastened to the outer end of c. W is a weight fastened to the wire ring b, which weight and ring are suspended upon the spindle c and within the cup or band C by means of a small bent wire, e, which forms a spring. This small wire is, at the center, permanently fastened to the spindle c, and the ends thereof may be pivoted in or fastened to the ring b. These parts are so arranged that the weight, in its natural position, will be but a short distance from the band C, or, when the band is not used, but a short distance from the side of the cup. In consequence of such arrangement the instrument is not likely to be injured by rough or careless usage, and the wire and spring e can safely be quite small, since the vertical movement of the weight will be arrested by the band C, and its lateral movement by the bottom of the cup and the disk D; and this is an essential feature of my invention. When the band C is not used the cup may be about three inches in diameter for ordinary purposes. By placing a spirit-bubble, F, in one edge of the block the instrument can be used as a common level.

With this instrument any desired angle can readily be obtained. When standing level the pointer will be at O. If the instrument be raised or depressed at either end the angle at which it stands will be accurately indicated by the pointer, because the weight W, being secured to the spindle c by means of the ring b and spring-wire e, (the spindle moving easily in its bearings,) will always retain a perpendicular position, keeping the pointer in such position.

I do not confine myself to the exact method shown of suspending the weight, though I regard this as simple and efficient; but it is evident that other springs differently constructed and arranged may be used.

Having thus fully described my invention, what I claim as new, and desire to secure by Letters Patent, is as follows:

The combination of the springs e and weight b W with the dial D, index d, and case B, substantially as and for the purposes specified.

NELSON BARNUM.

Witnesses:
   E. A. WEST,
   O. W. BOND.